United States Patent [19]
Ohsawa et al.

[11] Patent Number: 5,803,998
[45] Date of Patent: Sep. 8, 1998

[54] PNEUMATIC RADIAL TIRES WITH AT LEAST THREE TREAD RADII OF CURVATURE

[75] Inventors: Yasuo Ohsawa; Hiroshi Kadowaki, both of Kodaira, Japan

[73] Assignee: Bridgestone Corporation, Tokyo, Japan

[21] Appl. No.: 637,375

[22] Filed: Apr. 25, 1996

[30] Foreign Application Priority Data

Apr. 27, 1995 [JP] Japan .................................... 7-103482
Jun. 30, 1995 [JP] Japan .................................... 7-165627

[51] Int. Cl.$^6$ .............................. B60C 3/00; B60C 3/04; B60C 11/00
[52] U.S. Cl. ....................... 152/209 R; 152/454
[58] Field of Search ................. 152/454, 209 R

[56] References Cited

U.S. PATENT DOCUMENTS 4,756,352  7/1988  Ogawa et al. .
5,247,979  9/1993  Asano .

FOREIGN PATENT DOCUMENTS 0 402 303 A1  12/1990  European Pat. Off. .
0 477 542 A2   4/1992  European Pat. Off. .
5-229308       9/1993  Japan ............................. 152/209 R

OTHER PUBLICATIONS

English translation of Japanese patent application (Kokai) 5–229308, Sep. 7, 1993.
European Search Report dated Apr. 25, 1997 for European application No. 96302955.

*Primary Examiner*—Adrienne C. Johnstone
*Attorney, Agent, or Firm*—Sughrue, Mion, Zinn, Macpeak & Seas, PLLC

[57] ABSTRACT

A pneumatic radial tire having an excellent resistance to uneven wear is provided by optimizing a crown profile of a tread portion, in which at least a radial half section of the crown profile with respect to an equatorial plane of the tire is divided into center and middle and shoulder regions and comprised of a composite arc formed by smoothly connecting at least three arcs having different radii of curvature to each other and each of distances and radii of curvature of these regions satisfies a particular relation.

1 Claim, 3 Drawing Sheets

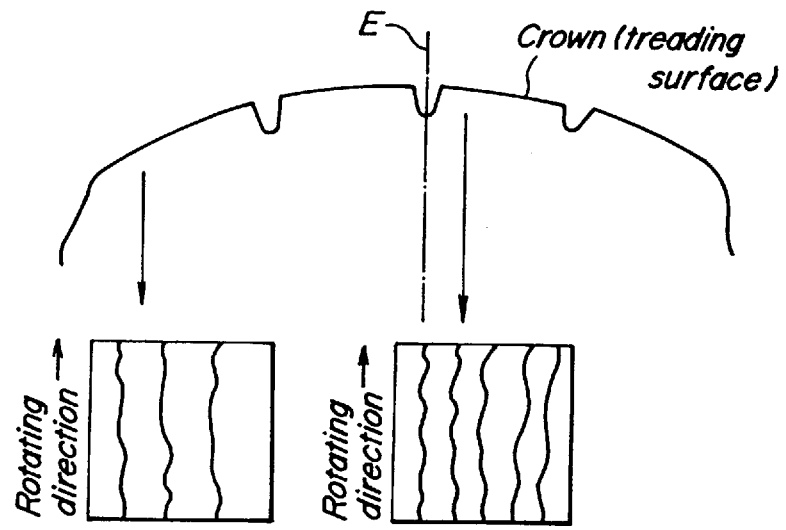
FIG. 4
CONVENTIONAL
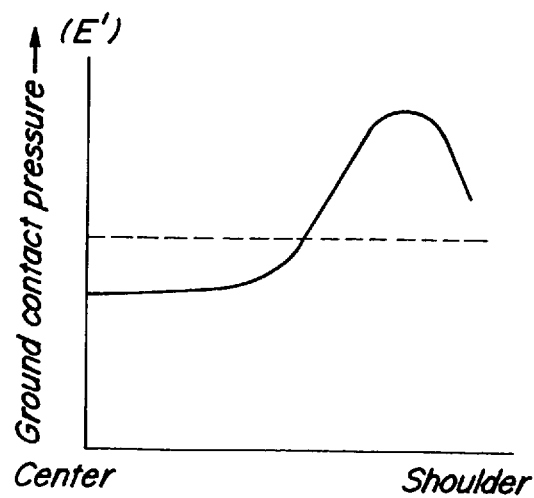
FIG. 5
CONVENTIONAL

PNEUMATIC RADIAL TIRES WITH AT LEAST THREE TREAD RADII OF CURVATURE

BACKGROUND OF THE INVENTION

1. Field of the Invention

This invention relates to pneumatic radial tires for use in relatively small-size automobiles such as a passenger car, van, pickup, truck and the like more particularly it relates to a pneumatic radial tire having an improved resistance to uneven wear of the tread rubber in a tread portion.

2. Description of Related Art

When an automobile, especially the above type of the relatively small-size automobile is run on a road surface of many curves seen in streets, slopes and the like at a relatively high frequency, tires mounted onto the automobile tend to create such an uneven wear that the wearing of a tread rubber located at both side regions of a tread portion the shoulder region, becomes greater and faster than the wearing of the tread rubber located at a central region thereof.

As the uneven wear progresses, the tire is rendered into a spent tire while a great amount of unused rubber is left in the central region of the tread portion, which obstructs an effective utilization of the tire. For this end, it has been attempted to round a crown profile of the tread portion at section as far as possible (i.e. the crown profile is defined by arcs having a small radius of curvature). This is effective and widely adopted as a countermeasure for improving this type of the uneven wear.

However, it has been confirmed that this countermeasure is certainly effective for the control of the uneven wear under a condition of running on a curved road at a higher frequency, but undesirably promotes the uneven wear of the shoulder region during straight running. This results from the fact that the difference of ground contact length between the central region of the crown profile of the tread portion and the shoulder region is large in straight running.

SUMMARY OF THE INVENTION

It is, therefore, an object of the invention to provide pneumatic radial tires having a long service life capable of contributing to the effective utilization of the tire by preventing premature wearing of a tread rubber at the shoulder region to uniformly wear the tread rubber along the crown profile in the widthwise direction whether the primary running form is curved running or straight running and irrespective of the mixing ratio of both running forms.

According to the invention, there is the provision of in a pneumatic radial tire comprising a pair of bead portions, a pair of sidewall portions and a tread portion toroidally extending between the sidewall portions, the improvement wherein a crown of the tread portion at a section of a plane including a rotational axis of a tire-wheel assembly when the tire is mounted onto a standard rim and inflated under a standard internal pressure is comprised of a composite arc smoothly connecting at least three arcs having different radii of curvature to each other; and when the crown is divided from an equatorial plane of the tire toward an end of the crown into a center region, a middle region and a shoulder region in this order and a distance ranging from the equatorial plane to an outer end of each of these regions is L and a radius of curvature of an arc in each of these regions is R, distance ($L_1$) and radius of curvature ($R_1$) of the center region, distance ($L_2$) and radius of curvature ($R_2$) of the middle region and distance ($L_3$) and radius of curvature ($R_3$) of the shoulder region satisfy the following relations with respect to a distance W ranging from an outermost end of the crown to the equatorial plane at a contact zone when the above assembly is pushed onto a flat plate under a standard load and after the load is released:

$L_1=(0.3-0.6)\times W$, $R_1=(8-20)\times W$,
$L_2=(0.6-0.9)\times W$, $R_2=(1.5-3.5)\times W$,
$L_3=(0.9-1.0)\times W$, $R_3=(0.5-1.0)\times W$.

BRIEF DESCRIPTION OF THE DRAWINGS

The invention will be described with reference to the accompanying drawings, wherein:

FIG. 4 is a schematical view illustrating an abrasion pattern of the conventional tire; and FIG. 5 is a graph showing a distribution of ground contact pressure in the conventional tire.

DESCRIPTION OF THE PREFERRED EMBODIMENTS

Figure 1:
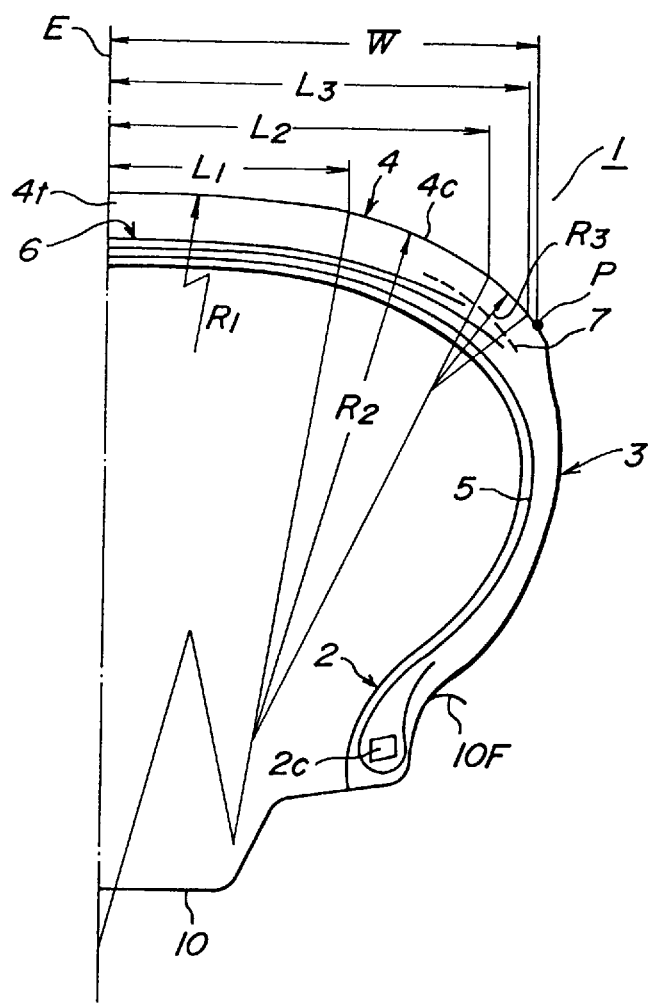
FIG. 1 is a schematically right-half radial section view of an assembly of a pneumatic radial tire according to the invention and a rim.

In FIG. 1 is schematically illustrated a right-half radial section of a tire-rim assembly when a pneumatic radial tire 1 is mounted onto a standard rim 10 and inflated under a standard internal pressure. In this case, a left-half radial section is not necessarily the same as the right-half radial section, or both sections may be slightly different. Moreover, the rim is shown only by an outer profile line. Numeral 10F is a rim flange. The standard rim and standard internal pressure are based on a permitted rim and a load capacity-air pressure table corresponding to a size of a radial ply tire defined in JATMA YEAR BOOK 1992 (standard of The Japan Auto Tire Manufacturers Association).

The pneumatic radial tire 1 shown in FIG. 1 comprises a pair of bead portions 2, a pair of sidewall portions 3 and a tread portion 4 toroidally extending between the sidewall portions 3. Moreover, the tire 1 is provided with a radial carcass 5 extending between a pair of bead cores 2c embedded in the bead portions 2 and reinforcing the bead portions 2, the sidewall portions 3 and the tread portion 4, a belt 6 reinforcing the tread portion 4, and a so-called layer 7 of nylon cords arranged substantially along a circumference of the tread portion 4 for reinforcing each end region of the belt 6 in accordance with custom. On the other hand, grooves formed in a tread rubber 4t are omitted.

A crown 4c of the tread portion 4 (nomenclature of a tread or a treading surface at tire section) is comprised of a composite arc smoothly connecting at least three arcs having different radii of curvature to each other. In the illustrated embodiment, the composite arc is comprised of three arcs having radii of curvature $R_1$, $R_2$ and $R_3$. The wording "smooth connection" used herein means that the arcs are connected so as to have adjacent arced-curves come into contact with each other or share a tangent on a shared point between the two adjacent arced-curves.

The crown 4c is divided from an equatorial plane E of the tire toward an end of the crown 4c into a center region, a middle region and a shoulder region in this order. Among distances (L) of outer ends of these regions measured from the equatorial plane E, the center region corresponds to a region covered by a distance $L_1$, and the middle region corresponds to a region defined between the distance $L_1$ and a distance $L_2$, and the shoulder region corresponds to a region defined between the distance $L_2$ and a distance $L_3$. All of these regions are extended over a full circumference of the tread portion.

In the full profile of the crown 4c, the center region has a radius of curvature $R_1$, the middle region has a radius of curvature $R_2$, and the shoulder region has a radius of curvature $R_3$, respectively.

The distances $L_1$, $L_2$ and $L_3$ are determined in relation to an outermost end P of the crown 4c as mentioned below. That is, the outermost end P used herein means a crown end located in an outermost side of the tire 1 at a contact zone when an assembly of the tire 1 and the rim 10 inflated under the standard internal pressure is pushed onto a flat plate under the standard load and after such a load is released as shown in FIG. 1. As to a distance W ranging from the outermost end P to the equatorial plane E, the distance $L_1$ is within a range of 0.3 W–0.6 W, and the distance $L_2$ is within a range of 0.6 W–0.9 W, and the distance $L_3$ is within a range of 0.9 W–1.0 W. In this case, the outermost end P is an outermost end of the crown located at a side defining the distances $L_1$, $L_2$, $L_3$ with respect to the equatorial plane E. Moreover, the above contact zone is a contact region of the tread at such a state that the rotational axis of the assembly is parallel to a surface of the flat plate under the standard load.

Furthermore, the radii of curvature $R_1$, $R_2$, $R_3$ are determined in relation to the distance W between the outermost end P of the crown 4c and the equatorial plane E of the tire likewise the above distances. That is, the radius of curvature $R_1$ is within a range of 8 W–20 W, and the radius of curvature $R_2$ is within a range of 1.5 W–3.5 W, and the radius of curvature $R_3$ is within a range of 0.5 W–1.0 W, respectively. In order to form the composite arc by smoothly connecting these arcs having the radii of curvature $R_1$, $R_2$ and $R_3$ to each other, a center of the radius of curvature $R_1$ is placed on the equatorial plane E of the tire, and a center of the radius of curvature $R_2$ is placed on a line of the radius of curvature $R_1$ passing through a point of the crown 4c at the distance $L_1$, and a center of the radius of curvature $R_3$ is placed on a line of the radius of curvature $R_2$ passing through a point of the crown 4c at the distance $L_2$.

The inventors have fully observed the uneven wear of tread rubber created in the shoulder region of the conventional tire when the frequency of the cornering operation in the automobile is high and a lateral force input from a road surface into the treading surface of the tread portion in the cornering is large or the side force or cornering force generated in the tire is large, and arrived at first and second conclusions as mentioned below.

It is known that when a force is applied to the surface of the tread rubber contacting with the road surface and a slippage is created between the tread rubber surface and the road surface, a stripe pattern is formed on the tread rubber surface in a direction substantially perpendicular to the force applying direction. This pattern is called an abrasion pattern. As a result of detail observation on the abrasion pattern in the uneven worn tire, it has been confirmed that this pattern is generated over the entirety of the treading surface in its widthwise direction at a state that the direction of the linear stripe extends substantially along the circumference of the treading surface as outlinedly shown in FIG. 4. Particularly, it is important that an interval (pitch) between linear stripes in the center region of the treading surface is narrow (small), while the pitch in the shoulder region is considerably larger than that in the center region. Moreover, FIG. 4 shows a profile of the crown (treading surface) together with schematic abrasion patterns in frames indicated by arrows corresponding to the center region and shoulder region of the crown.

The size of the pitch in the linear stripe pattern is proportional to the wear rate of the rubber. That is, the small pitch means that the wear rate is slower, while the large pitch means that the wear rate is faster. In the abrasion pattern of FIG. 4, therefore, it is a matter of course that the worn amount of the shoulder region is considerably larger than that of the center region. This results from a fact that a relation of (worn amount of tread rubber) $\alpha$ (ground contact pressure)×(friction coefficient)×(lateral force) is established in all regions of the treading surface in the widthwise direction of the tread portion. Finally, the difference of ground contact pressure between the regions because the lateral force applied to the treading surface of the tread portion and the friction coefficient at the ground contact region are equal over the full width of the crown.

In fact, the distribution of ground contact pressure in the same new tire as the conventional tire used to the observation of uneven wear is measured to obtain results as shown in FIG. 5. In FIG. 5, an ordinate (E') is coincident with the equatorial plane E of the tire. As seen from FIG. 5, the ground contact pressure in the shoulder region indicates a large peak and the vicinity of this peak position corresponds to the abrasion pattern in the frame shown in the left side of FIG. 4. That is, when the lateral force is applied to the treading surface of the tread portion at a high frequency, the uneven wear produced in the shoulder region is mainly influenced by the ground contact pressure. Therefore, a first conclusion lies in that it is necessary to make the distribution of ground contact pressure in the widthwise direction of the crown equal as far as possible for preventing the occurrence of this uneven wear.

As an effective countermeasure for preventing uneven wear of the tread rubber due to frequent repetition of the cornering, it has hitherto been adopted to round the crown shape. When uneven wear due to premature wearing of the tread rubber in the shoulder region of the tire provided with such a rounded crown is examined in detail during the straight running of the automobile, it has been confirmed that a portion having a shorter ground contacting length in the treading surface of the tread portion or the shoulder region always indicates a braking behavior to the road surface during the running of the tire. That is, it has been confirmed from the observation of the abrasion pattern that a braking force based on the above behavior is applied as an external force to the shoulder region substantially along the running (rotating) direction of the tire.

When the braking force exceeds the effect of controlling the wear at a lower ground contact pressure, the wear amount of the tread rubber represented by the above proportional relation is considerably larger in the shoulder region than in the center region, which results in the occurrence of uneven wear in the tire provided with the rounded crown during the straight running of the tire. This type of uneven wear is a wearing form called as self-excited wearing as compared with the forcible wearing accompanied with the cornering. Therefore, the second conclusion lies in that it is necessary to make the ground contact length along the rotating direction of the ground contact area of the tread portion over the full width of the crown equal as far as possible or make the distribution of the ground contact length same as far as possible for preventing uneven wear produced in the straight running of the tire.

From the above first and second conclusions, it has been found that it is necessary to simultaneously establish the equalization of the ground contact pressure distribution and the equalization of the ground contact length distribution as far as possible, or to make both the distribution states same together as far as possible in order to prevent the uneven wear produced in the cornering and straight running. In order to equalize these distributions, it is useful to standardize a certain specified element at a ground contacting state of the treading surface in the tread portion 4. According to the invention, the distance W from the outermost end P of the crown 4c after the complete removal of the load to the equatorial plane E of the tire is adopted as the above specified element instead of a maximum ground contact half-width under the standard loading because it has been confirmed that there is a difference between the maximum ground contact half-width and the distance W after removal of the load. That is, it is actually effective to adopt the position of the outermost end P in the assembly of the tire 1 and the rim 10.

Furthermore, it is reasonable to adopt the tire form near the actual running state as far as possible for realizing the first and second conclusions. In this connection, according to the invention, the crown 4c of the tread portion 4 in the assembly of the tire 1 and the standard rim 10 inflated under the standard internal pressure comprises the composite arc formed by smoothly connecting at least three arcs (three arcs in the embodiment of FIG. 1) having different radii of curvature ($R_1$, $R_2$, $R_3$ in the embodiment of FIG. 1) to each other, whereby the equalizations of the ground contact pressure and the ground contacting length can easily be realized in conformity with the actual state.

When the crown 4c having radii of curvature $R_1$, $R_2$, $R_3$ is divided into a center region, middle region and shoulder region (only in one-side zone from the equatorial plane E) to measure a distance (L) measured from the equatorial plane E to an outer end of each of these regions, the simultaneous establishment between the equalization of ground contact pressure distribution and equalization of ground contacting length distribution is obtained or both the distributions may be put close to the same state when the distance $L_1$ and radius of curvature $R_1$ of the center region, the distance $L_2$ and radius of curvature $R_2$ of the middle region, and the distance $L_3$ and radius of curvature $R_3$ of the shoulder region satisfy the following relations with respect to the distance W ranging from the outermost end P of the crown 4c to the equatorial plane E:

$L_1=(0.3-0.6)\times W$, $R_1=(8-20)\times W$.
$L_2=(0.6-0.9)\times W$, $R_2=(1.5-3.5)\times W$,
$L_3=(0.9-1.0)\times W$, $R_3=(0.5-1.0)\times W$.

Figure 2:
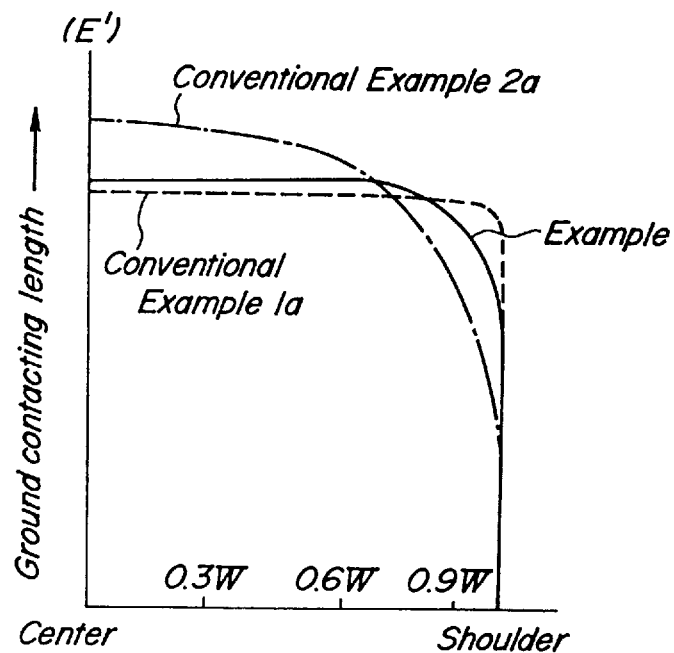
FIG. 2 is a graph showing a distribution of ground contacting length at a ground contact area in an embodiment according to the invention.
Figure 3:
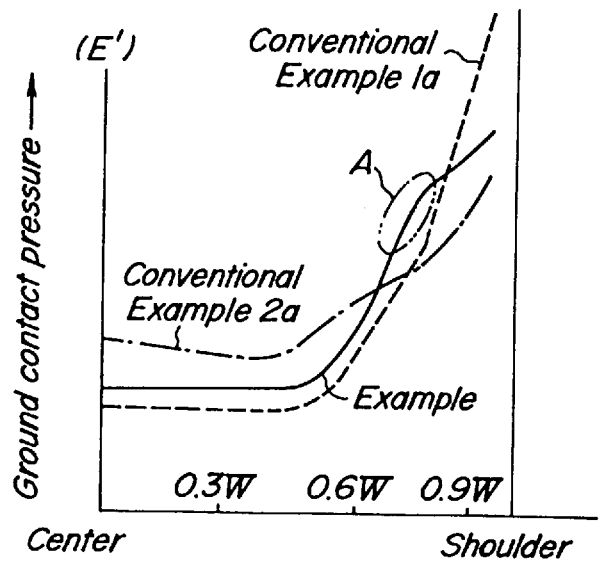
FIG. 3 is a graph showing a distribution of ground contact pressure at a ground contact area in an embodiment according to the invention.

This is explained with reference to FIGS. 2 and 3 showing results measured on an upper half portion of ground contacted shape and ground contact pressure distribution from the center (equatorial plane E) to the shoulder in an example according to the invention (shown by a solid line), a conventional example 1a creating uneven wear through the action of lateral force at a high frequency (shown by dotted lines) and a conventional example 2a creating uneven wear during the straight running (shown by dot-dash lines). The tire to be measured is a pneumatic radial tire for passenger car having a tire size of 175/80R14. Moreover, the ordinate (E') in FIGS. 2 and 3 is coincident with the equatorial plane E of the tire, while only an outer profile of the crown at ground contact state is shown in FIG. 2 for measuring the ground contacting length.

As to the ground contact length at the ground contacted state shown in FIG. 2, the conventional example 1a shows a uniform distribution over a full range from the center to the shoulder, while the conventional example 2a shows such a distribution that the ground contacting length is maximum at the equatorial plane E and gradually decreases up to a region of about 0.6 W and rapidly decreases toward the shoulder end. On the contrary, the example according to the invention shows such a distribution that the ground contacting length is constant in the center region and slightly increases in the middle region and rapidly decreases in the shoulder region. Moreover, the ground contact area is substantially the same in all of these tires.

The ground contact pressure distribution corresponding to the ground contact state of FIG. 2 is shown in FIG. 3, whereby the ground contact pressure at the shoulder region is described below.

As illustrated FIG. 3 showing results measured on many experiments for the ground contact pressure distribution, the pneumatic radial tire for a passenger car is obliged to have a tendency that the ground contact pressure of the treading surface of the tread portion 4 becomes higher in the shoulder region of the crown 4c. The region having such a high ground contact pressure is largely worn through the action of big lateral force as compared with the other regions to produce the uneven wear. Particularly, it has been confirmed that the conventional example 1a rapidly raises the ground contact pressure when the distance L measured from the equatorial plane E is between 0.6 W and 0.9 W and the region having the high ground contact pressure is existent from this distance up to about 1 W.

For this end, it is necessary to make the radius of curvature $R_3$ in the shoulder region of the crown as small as possible to reduce the ground contact pressure. When the radius of curvature $R_3$ is too small, the distribution of the ground contacting length is close to that of the conventional example 2a shown in FIG. 2. In order to avoid such a ground contacting length distribution, the minimum value of the radius of curvature $R_3$ is restricted to 0.5 W, whereby the resistance to uneven wear during the straight running is advantageously maintained. On the other hand, the great rise of the ground contact pressure is suppressed by restricting the maximum value of the radius of curvature $R_3$ to 1 W. Moreover, the distance $L_3$ of the shoulder region is restricted to a range of 0.9 W–1 W because it may be required to change the performances on wearing in accordance with commercial demand.

As to the middle region, the ground contact pressure starts to rise at a position such that the distance measured from the equatorial plane E is about 0.6 W as shown in FIG. 3. It has been confirmed that the middle region is a region showing a distribution of a high ground contact pressure next to the shoulder region. Therefore, the distance $L_2$ is set to a range of 0.6 W–0.9 W, while the middle region is defined between the distance $L_1$ and the distance $L_2$. In this case, it is desirable to reduce the ground contact pressure of the shoulder region by setting the radius of curvature $R_2$ in the middle region to a large value as far as possible. However, when the radius of curvature $R_2$ is too large, even if the radius of curvature $R_3$ in the shoulder region is made as small as possible, the highest ground contact pressure in the shoulder region can not be controlled as compared with the conventional example 1a and hence the uneven wear is caused by the input of large lateral force. In order to avoid this problem, the maximum value of the radius of curvature $R_2$ is restricted to 3.5 W.

As a result, the ground contact pressure higher than that of the conventional example 1a is obtained in a zone A enclosed by phantom line on the curve of the example in FIG. 3, so that the ground contact pressure of the shoulder region is considerably lower than that of the conventional example 1a. On the other hand, when the radius of curvature $R_2$ is less than 1.5 W, the ground contacting length of the shoulder region is too short and the resistance to uneven wear in the straight running is degraded.

In the center region, it is desirable that the value of the radius of curvature $R_1$ is made as large as possible for reducing the ground contact pressure of the shoulder region. However, if the radius of curvature $R_1$ is too large, there is formed so-called butterfly-type ground contact profile in which a portion having a short ground contacting length is formed in the center region and the ground contacting length of the shoulder region becomes longer. As a result, the resistance to uneven wear in the straight running is degraded. In order to avoid such an inconvenience, therefore, the upper limit of the radius of curvature $R_1$ is restricted to 20 W. On the other hand, when the radius of curvature $R_1$ is less than 8 W, even if the radii of curvature $R_2$, $R_3$ have the afore-mentioned upper limits, the ground contacting lengths of the middle and shoulder regions are much shorter than that of the center region and hence the resistance to uneven wear in the straight running is degraded.

As mentioned above, the uneven wear produced in the shoulder region can advantageously be improved according to the invention.

The afore mentioned crown profile is adapted to the improvement of the resistance to uneven wear in the running under a service condition having a proper mixing ratio of curved running and straight running. However, a biased service condition exists that is mainly composed of the curved running having a relatively large curvature and a biased service condition mainly composed of the straight running in accordance with road conditions. Under the above biased service conditions, it is effective to more improve the resistance to uneven wear by adopting the crown profile so as to satisfy the relations of the distances $L_1$–$L_3$ and radii of curvature $R_1$–$R_3$ with respect to the distance W as mentioned below, respectively.

That is, it is preferable that the following relations of the distances $L_1$–$L_3$ and radii of curvature $R_1$–$R_3$ with respect to the distance W are satisfied under the biased service condition mainly composed of the curved running:

$L_1$=(0.5–0.6)×W, $R_1$=(8–12)×W,
$L_2$=(0.8–0.9)×W, $R_2$=(1.5–2.5)×W,
$L_3$=(0.9–1.0)×W, $R_3$=(0.5–0.75)×W.

On the other hand, it is preferable that the following relations of the distances $L_1$–$L_3$ and radii of curvature $R_1$–$R_3$ with respect to the distance W are satisfied under the biased service condition mainly composed of the straight running:

$L_1$=(0.3–0.5)×W, $R_1$=(12–20)×W,
$L_2$=(0.6–0.8)×W, $R_2$=(2.5–3.5)×W,
$L_3$=(0.9–1.0)×W, $R_3$=(0.75–1.0)×W.

Moreover, resistance to uneven wear is considerably improved when the following relations of the distances $L_1$–$L_3$ and radii of curvature $R_1$–$R_3$ with respect to the distance W are satisfied under the service condition having a proper mixing ratio of curved running and straight running;

$L_1$=(0.4–0.6)×W, $R_1$=(8–15)×W,
$L_2$=(0.75–0.85)×W, $R_2$=(2.0–3.0)×W,
$L_3$=(0.9–1.0)×W, $R_3$=(0.5–0.8)×W.

The following examples are given in illustration of the invention and are not intended as limitations thereof.

A pneumatic radial tire for passenger car to be tested having a tire size of 175/80R14 is the tire 1 having the structure as shown in FIG. 1 in which the radial carcass 5 is a single rubberized ply containing polyester cords, and the belt 6 is comprised of two steel cord cross layers, and the layer 7 is a rubberized layer containing nylon cords of 1260 d/2. The tire 1 is mounted onto a standard rim 10 of 5J×14 and inflated under a standard internal pressure of 190 kPa to form a tire-rim assembly. When a load of 495 kg is applied to this assembly and then released, the distance W between the equatorial plane E and the outermost end P on the treading surface of the tread portion 4 is 60 mm. There are provided 21 test tires, in which 13 tires are the examples according to the invention, 2 tires are the conventional examples and 6 tires are the comparative examples. The distances $L_1$, $L_2$, $L_3$ from the equatorial plane E and the radii of curvature $R_1$, $R_2$ $R_3$ of the crown 4c in these tires with respect to the distance W are shown in Table 1. In this case, for instance, numerical value of 0.5 means 0.5 W and so forth.

Then, each of these test tires is mounted onto an automobile and actually run under the following two running conditions to conduct uneven wearing tests.

Running condition (1): The automobile is mainly run on general-purpose streets and slopes having many curves frequently subjected to input of lateral force (side force or cornering force)

Running condition (2): The automobile is mainly run on an expressway for straight running.

After running over a given distance, the worn amount per unit width of 5 mm is measured in the widthwise direction of the crown 4c to determine a ratio of worn amount in the shoulder region to worn amount in the center region. As the value of the wear amount ratio becomes near to 1.0, the better the resistance to uneven wear. The measured values of the wear amount ratio are shown in the columns "Running condition" of Table 1.

TABLE 1

|  | Example | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| $L_1$ (×W) | 0.5 | 0.6 | 0.3 | 0.6 | 0.3 | 0.6 | 0.45 | 0.45 | 0.45 | 0.4 | 0.4 | 0.5 | 0.5 |
| $R_1$ (×W) | 9.0 | 13.0 | 8.0 | 20.0 | 8.0 | 20.0 | 14.0 | 14.0 | 14.0 | 17.0 | 18.0 | 12.0 | 11.0 |
| $L_2$ (×W) | 0.85 | 0.8 | 0.6 | 0.7 | 0.9 | 0.9 | 0.75 | 0.75 | 0.75 | 0.7 | 0.8 | 0.7 | 0.8 |
| $R_2$ (×W) | 2.0 | 3.0 | 1.5 | 1.5 | 3.5 | 3.5 | 2.5 | 2.5 | 2.5 | 2.5 | 2.0 | 2.5 | 2.0 |
| $L_3$ (×W) | 1.0 | 1.0 | 0.98 | 0.9 | 0.97 | 0.92 | 0.95 | 0.90 | 1.0 | 0.96 | 0.94 | 0.96 | 0.94 |
| $R_3$ (×W) | 0.9 | 0.5 | 1.0 | 0.5 | 1.0 | 0.6 | 0.75 | 0.5 | 1.0 | 0.7 | 0.7 | 0.8 | 0.8 |

TABLE 1-continued

| | | | | | | | | | | | | | |
|---|---|---|---|---|---|---|---|---|---|---|---|---|---|
| Running condition (1) | 1.2 | 1.3 | 1.2 | 1.3 | 1.2 | 1.3 | 1.2 | 1.3 | 1.2 | 1.3 | 1.3 | 1.2 | 1.2 |
| Running condition (2) | 1.3 | 1.2 | 1.3 | 1.2 | 1.3 | 1.2 | 1.2 | 1.2 | 1.2 | 1.2 | 1.2 | 1.3 | 1.3 |

| | | Conventional Example | | Comparative Example | | | | | |
|---|---|---|---|---|---|---|---|---|---|
| | | 1 | 2 | 1 | 2 | 3 | 4 | 5 | 6 |
| | $L_1$ (×W) | 0.65 | 0.4 | 0.4 | 0.4 | 0.6 | 0.6 | 0.4 | 0.4 |
| | $R_1$ (×W) | 6.0 | 5.0 | 7.0 | 25.0 | 8.0 | 8.0 | 10.0 | 10.0 |
| | $L_2$ (×W) | 0.95 | 0.9 | 0.7 | 0.7 | 0.8 | 0.8 | 0.9 | 0.9 |
| | $R_2$ (×W) | 2.0 | 1.5 | 2.0 | 2.0 | 1.0 | 4.0 | 2.0 | 2.0 |
| | $L_3$ (×W) | 1.0 | 1.0 | 1.0 | 1.0 | 1.0 | 1.0 | 1.0 | 1.0 |
| | $R_3$ (×W) | 0.5 | 0.4 | 1.0 | 1.0 | 0.5 | 0.5 | 0.4 | 1.2 |
| | Running condition (1) | 2.0 | 1.7 | 1.6 | 1.4 | 1.6 | 1.6 | 1.7 | 1.5 |
| | Running condition (2) | 1.2 | 1.5 | 1.4 | 1.6 | 1.3 | 1.4 | 1.3 | 1.5 |

In order to check the effect of the invention in a pneumatic radial tire for passenger car having a smaller aspect ratio, there are provided three test tires having a tire size of 205/70R14 as Example 14 and Comparative Examples 7 and 8. Each of these tires is mounted onto a standard rim off 51/2J×14 and inflated under a standard internal pressure of 195 kPa to form a tire-rim assembly. When a load of 590 kg is applied to this assembly and then released, the distance W between the equatorial plane E and the outermost end P on the treading surface of the tread portion is 72 mm. The distances $L_1$, $L_2$, $L_3$ and the radii of curvature $R_1$, $R_2$, $R_3$ with respect to the distance W in these tires are shown in Table 2.

After the test for uneven wear is carried out under the same running conditions (1) and (2) as in Example 1, the resistance to uneven wear is evaluated in the same manner as in Example 1 to obtain results as shown in Table 2.

TABLE 2

| | Example | Comparative Example | |
|---|---|---|---|
| | 14 | 7 | 8 |
| L1 (xW) | 0.5 | 0.6 | 0.5 |
| R2 (xW) | 8.5 | 9.0 | 6.0 |
| L2 (xW) | 0.83 | 0.95 | 0.9 |
| R2 (xW) | 1.75 | 2.0 | 1.5 |
| L3 (xW) | 1.0 | 1.0 | 1.0 |
| R3 (xW) | 0.7 | 0.2 | 0.15 |
| Running condition (1) | 1.2 | 1.8 | 1.6 |
| Running condition (2) | 1.3 | 1.2 | 1.6 |

As seen from the evaluation results of Tables 1 and 2, the tires according to the invention exhibit a good wearing state different from the uneven wear because the wear amount of the shoulder region in the tread rubber is equal to that of the center region under both straight and corner running conditions and the value of the worn amount is not so large. On the contrary, the tires of the conventional and comparative examples exhibit uneven wear because the wear amount of the shoulder region is considerably larger than that of the center region under either or both of the above running conditions.

As mentioned above, it is obliged to generate the uneven wear of the shoulder region in the conventional tires under either or both of straight and corner running conditions. On the contrary, according to the invention, the occurrence of uneven wear of the shoulder region can effectively be prevented under both the above running conditions by optimizing the crown profile of the tread portion, whereby there can be provided pneumatic radial tires having an excellent resistance to uneven wear and a long service life.

What is claimed is:

1. In a small-size pneumatic radial tire comprising; a pair of bead portions, a pair of sidewall portions and a tread portion toroidally extending between the sidewall portions, the improvement wherein a crown of the tread portion at a section of a plane including a rotational axis of a tire-wheel assembly when the tire is mounted onto a standard rim and inflated under a standard internal pressure is comprised of a composite arc smoothly connecting at least three arcs having different radii of curvature to each other; and when the crown is divided from an equatorial plane of the tire toward an end of the crown into a center region, a middle region and a shoulder region in this order and an axial distance ranging from the equatorial plane to an outer end of each of these regions is L and a radius of curvature of an arc in each of these regions is R, distance ($L_1$) and radius of curvature ($R_1$) of the center region, distance ($L_2$) and radius of curvature ($R_2$) of the middle region and distance ($L_3$) and radius of curvature ($R_3$) of the shoulder region satisfy the following relations with respect to a distance W ranging from an outermost end of the crown to the equatorial plane at a contact zone when the above assembly is pushed onto a flat plate under a standard load and after the load is released: wherein the distances ($L_1$–$L_3$) and radii of curvature ($R_1$–$R_3$) with respect to the distance W satisfy the following relations:

$L_1 = (0.5-0.6) \times W$, $R_1 = (8-12) \times W$,
$L_2 = (0.8-0.9) \times W$, $R_2 = (1.5-2.5) \times W$,
$L_3 = (0.9-1.0) \times W$, $R_3 = (0.5-0.75) \times W$.

* * * * *